March 25, 1941.    F. J. LYDEN    2,236,436
CONDENSER INDUCTION MOTOR
Filed Nov. 1, 1939
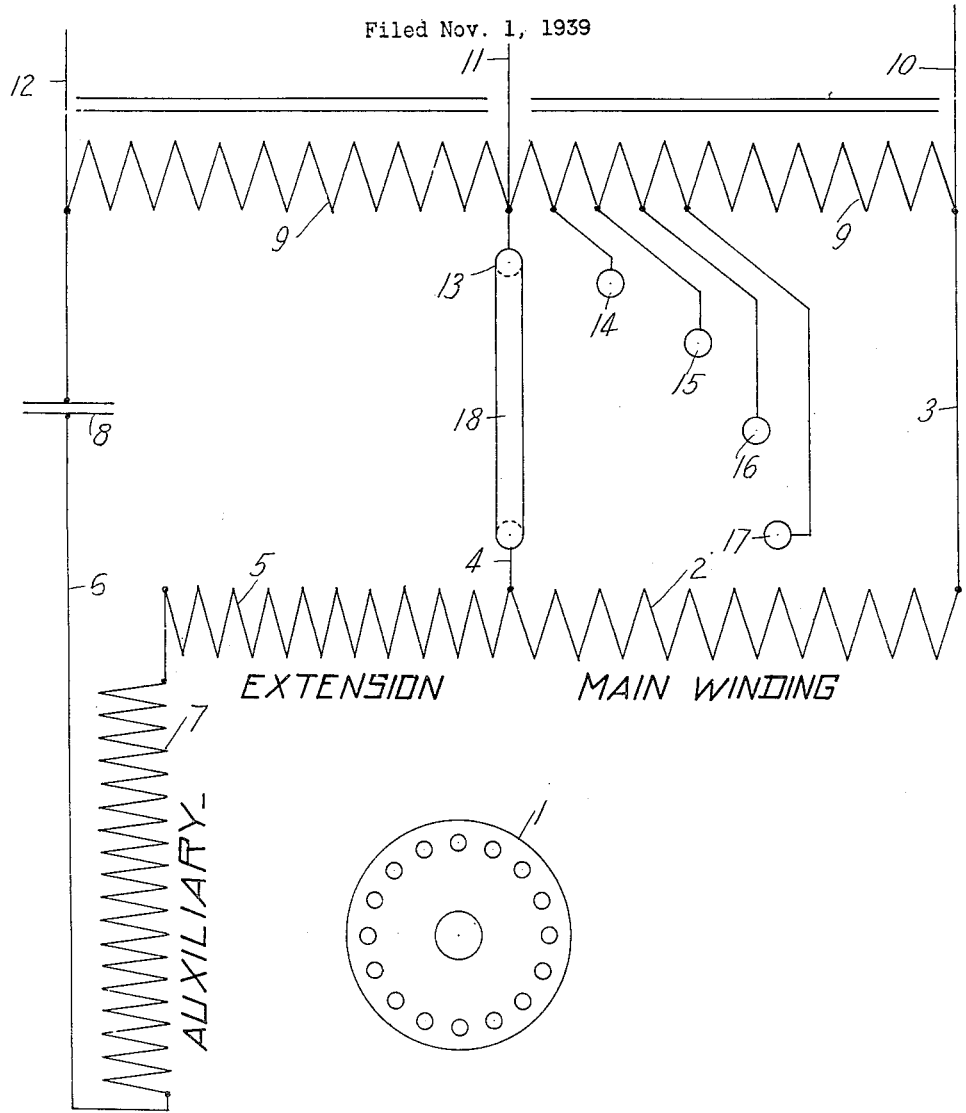
INVENTOR_
FRANK J. LYDEN_
by
his ATTORNEY.

Patented Mar. 25, 1941

2,236,436

UNITED STATES PATENT OFFICE 2,236,436

CONDENSER INDUCTION MOTOR

Frank J. Lyden, Dayton, Ohio, assignor to The Leland Electric Company, Dayton, Ohio, a corporation of Ohio Application November 1, 1939, Serial No. 302,399

7 Claims. (Cl. 172—278)

This invention relates to a condenser induction motor and one object of the invention is to provide a multi-speed condenser induction motor which will have a high starting torque on all speed connections, high full load speeds, high overload capacity and a high overall efficiency in smaller frame sizes.

A further object of the invention is to provide such a motor which will be so electrically balanced as to provide quiet operation.

A further object of the invention is to provide such a motor which is adapted to be connected across any one of a plurality of supply lines having different voltages and will perform equally well on all voltages.

A further object of the invention is to provide such a motor which will utilize a conventional small capacity condenser and will have a winding ratio which will give substantial electrical balance.

Other objects of the invention may appear as the motor is described in detail.

The accompanying drawing is a circuit diagram of one embodiment of the invention.

In this drawing I have illustrated the preferred embodiment of the invention and have shown the same as applied to a single phase condenser induction motor. The rotor 1 may be of any suitable character and is here shown as of the squirrel cage type. The main stator winding 2 is provided with leads 3 and 4 by means of which it may be connected across a source of current supply. Connected with the lead 4 is a main phase extension winding 5 which is so arranged with relation to the main winding 2 that a voltage may be induced therein by the transformer action of the main winding, and is preferably mounted in the same slots with the main winding. This extension winding is connected at that end opposite the lead 4 with a condenser circuit 6 which includes an auxiliary or starting winding 7 and a condenser 8. The several windings are in such ratio as to provide a good starting torque and to effect a substantial electrical balance which will produce a quiet operation of the motor. In the present arrangement the main winding 2 and the extension winding 5 have substantially the same number of effective turns and the auxiliary winding 7 has a number of effective turns approximately equal to the total turns in the main winding and the extension winding.

The main winding, extension winding and condenser circuit are connected in series across a transformer 9 which is provided with three leads, the leads 10 and 11 being adapted for connection across a 110 volt supply line and the leads 10 and 12 being adapted for connection across a 220 volt supply line. The transformer is provided with a plurality of intermediate taps 13, 14, 15, 16, and 17, the tap 13 being approximately at the center of the transformer. Means, such as a selecting switch 18, are provided for connecting any one of said taps with the lead 4, which is connected with both the main winding and the extension winding.

When the transformer is connected, by the leads 10 and 11, across the 110 volt supply line and the lead 4 is connected with the center tap 13 of the transformer, as shown in the drawing, a voltage of 110 volts will be impressed on both the main winding and the extension winding, and in addition to the voltage thus impressed upon the extension winding a further voltage of approximately 110 volts will be induced therein by the transformer action of the main winding and the total voltage impressed upon the auxiliary circuit will be approximately 220 volts.

Speed control may be obtained with a motor of the type here described if the load on the motor is a fan type load. As the voltage on the motor is reduced by means of the transformer the overload capacity of the motor will be reduced as the square of the voltage and the motor will slip allowing it to operate such a unit at variable speed. The speed of the motor is determined primarily by the voltage impressed upon the main winding and if this impressed voltage be decreased by shifting the selector switch 18 from the center tap 13 to one of the other taps the voltage induced in the extension winding will be correspondingly reduced but the voltage impressed upon the extension circuit by the transformer will be correspondingly increased. For example, if the taps are spaced one from the other approximately 10 volts and the lead 4 is connected with the tap 15, ninety volts will be impressed upon the main winding and approximately ninety volts will be induced in the extension winding, and approximately one hundred and thirty volts will be impressed upon the extension winding, thus providing the extension winding with approximately 220 volts which are impressed upon the auxiliary winding.

The transformer can, of course, be used on dual voltage having a ratio of 1:2. For instance, leads 10 and 11 may be connected across a 110 volt line or leads 10 and 12 may be connected across a 220 volt line with equal performance.

The transformer as shown is adapted for connection with 110 volt and 220 volt supply lines only but it will be obvious that the transformer may, if desired, be of such a character that it may be connected with additional supply lines having higher voltage.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

1. In a condenser induction motor, a main stator winding, a transformer connected at one end with one end of said main winding and having a plurality of intermediate taps, selective means for connecting the other end of said main winding with any one of said taps, a main phase extension winding connected at one end with said selective connecting means, a condenser circuit connected at the other end with said extension winding and with the other end of said transformer and including an auxiliary winding displaced with relation to said main winding, and a condenser.

2. In a condenser induction motor, a transformer, a main stator winding, a main phase extension winding, an auxiliary winding displaced with relation to said main winding, and a condenser, all connected in series across said transformer, said transformer having a plurality of taps, and means for connecting said main winding and said extension winding with the same tap and for shifting said connection from one tap to another to decrease the voltage impressed on one of said windings and correspondingly increase the voltage impressed on the other of said windings.

3. In a condenser induction motor, a main stator winding, a main phase extension winding connected with said main winding, a condenser circuit connected with said extension winding and including an auxiliary winding displaced with relation to said main winding and a condenser, a transformer connected with said condenser circuit and with said main winding and having a plurality of taps, and means for connecting said main winding and said extension winding at their point of connection one with the other with any one of said taps.

4. In a condenser induction motor, a main stator winding, a main phase extension winding connected with said main winding and so arranged that a voltage will be induced therein by the transformer action of said main winding, a condenser circuit connected with said extension winding and including an auxiliary winding displaced with relation to said main winding and a condenser, means for impressing voltages on said main winding and said extension winding, and means for decreasing the voltage impressed on said main winding and for correspondingly increasing the voltage impressed on said extension winding.

5. In a condenser induction motor, a main stator winding, a main phase extension winding connected with said main winding and so arranged that a voltage will be induced therein by the transformer action of said main winding, a condenser circuit connected with said extension winding and including an auxiliary winding displaced with relation to said main winding and a condenser, and a transformer having a portion connected across said main winding to impress a voltage thereon and having another portion connected with said condenser circuit and arranged to impress on said extension winding a voltage in addition to said induced voltage, whereby the total of the two voltages will be impressed upon said auxiliary winding.

6. In a condenser induction motor, a main stator winding, a main phase extension winding, and a condenser circuit connected in series, said condenser circuit including an auxiliary winding displaced with relation to said main winding and a condenser, a transformer adapted to have different voltages impressed thereon, connected with said main winding and said condenser circuit and having a plurality of intermediate taps, a lead connected with said main winding and said extension winding, and means for connecting said lead with any one of said taps.

7. In a condenser induction motor, a transformer having a series of intermediate taps, a circuit comprising a main winding, a main winding extension, an auxiliary winding and a condenser connected in series, said circuit being connected across said transformer, a lead connected with both said main winding and said main winding extension, and switch means for connecting said lead with any one of the intermediate taps of said transformer to control the speed of said motor.

FRANK J. LYDEN.